(12) United States Patent
Watanabe et al.

(10) Patent No.: US 6,595,802 B1
(45) Date of Patent: Jul. 22, 2003

(54) CONNECTOR CAPABLE OF CONSIDERABLY SUPPRESSING A HIGH-FREQUENCY CURRENT

(75) Inventors: Shinya Watanabe, Tokyo (JP); Koji Kamei, Kawasaki (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 09/826,168

(22) Filed: Apr. 4, 2001

(30) Foreign Application Priority Data

Apr. 4, 2000 (JP) ....................................... 2000-101777

(51) Int. Cl.[7] .............................................. H01R 13/66
(52) U.S. Cl. ...................................................... 439/620
(58) Field of Search .............................. 439/607, 608, 439/620, 886

(56) References Cited

U.S. PATENT DOCUMENTS

| | | | | |
|---|---|---|---|---|
| 3,789,376 A | * | 1/1974 | Oshima et al. ............. | 365/139 |
| 4,187,481 A | * | 2/1980 | Boutros ...................... | 333/182 |
| 4,519,664 A | * | 5/1985 | Tillotson ................... | 439/607 |
| 5,035,652 A | * | 7/1991 | Shibano ..................... | 439/610 |
| 5,446,459 A | * | 8/1995 | Kim et al. .................. | 342/1 |
| 5,461,351 A | * | 10/1995 | Shusterman ................ | 333/181 |
| 5,499,935 A | * | 3/1996 | Powell ....................... | 439/620 |
| 5,535,079 A | * | 7/1996 | Fukazawa et al. .......... | 360/126 |
| 5,679,006 A | * | 10/1997 | Madelaine .................. | 439/63 |
| 5,938,450 A | * | 8/1999 | Nagafuji ..................... | 439/63 |
| 6,056,559 A | * | 5/2000 | Olson ......................... | 439/108 |
| 6,183,304 B1 | * | 2/2001 | Hollander et al. ........... | 439/620 |
| 6,196,876 B1 | * | 3/2001 | Paagman ..................... | 439/607 |
| 6,217,382 B1 | * | 4/2001 | Ziers ........................... | 439/578 |

FOREIGN PATENT DOCUMENTS

| | | | |
|---|---|---|---|
| JP | 05-159832 | * | 6/1993 |
| JP | 07131179 A | | 5/1995 |
| JP | 07254456 A | | 10/1995 |
| JP | 19500295 A | | 7/1996 |
| JP | 0884739 A | | 12/1998 |
| JP | 11185542 A | * | 7/1999 |

* cited by examiner

*Primary Examiner*—Lynn D. Feild
*Assistant Examiner*—Thanh-Tam Le
(74) *Attorney, Agent, or Firm*—Bradley Ruben

(57) ABSTRACT

In a connector having at least one contact (3a,3b) held by an insulator (2a), a high-frequency current suppressor (4a,4b) is provided on the contact or the insulator. The high-frequency current suppressor serves to attenuate a high-frequency current flowing through the contact and having a frequency within a frequency band between several tens MHz and several GHz.

25 Claims, 5 Drawing Sheets

CONNECTOR CAPABLE OF CONSIDERABLY SUPPRESSING A HIGH-FREQUENCY CURRENT

BACKGROUND OF THE INVENTION

This invention relates to a connector and, in particular, to a connector of a high-frequency current suppressing type having a function of attenuating a high-frequency current passing through the connector during use.

In the field of electronic communication, electronic apparatuses and data processing apparatuses (hereinafter collectively referred to as "system components") are combined together to be operated as a system. In order to connect the system components to one another, a connector is used as a terminal component for connection. The connector comprises at least one contact for transmitting a signal processed in each system component, and an insulator holding the contact. The connector of the type is generally classified into a pin connector (which may be called a male connector) having a pin-shaped contact or a socket connector (which may be called a female connector) having a socket-shaped contact.

In recent years, use has widely been made of a multi-contact connector comprising a number of contacts. In order to enable transmission of a considerable number of signals corresponding to a signal processing system supporting complicated functions in those system components recently used, a general multi-contact connector is designed so that a number of contacts are arranged in the insulator at a high density with a predetermined space kept from one another.

In the system components recently used, various kinds of electronic components are mounted. For example, these electronic components may be semiconductor active devices including a semiconductor memory such as a random access memory (RAM) and a read-only memory (ROM), a semiconductor integrated circuit device (IC), a semiconductor large-scale integrated circuit device (LSI), and a logic circuit device such as a microprocessor (MPU), a central processing unit (CPU), and an image processor arithmetic logic unit (IPALU). The multi-contact connector transmits the signals including a harmonic content having a high frequency ranging from several tens MHz to several GHz and produced as a result of high-speed operation of the semiconductor active devices.

If a high-frequency current in such a frequency band between several tens MHz and several GHz flows through a conventional connector such as the above-mentioned multi-contact connector, this may result in radiation of an undesired electromagnetic wave and occurrence of various kinds of electromagnetic interference because of presence of discontinuity at a connecting portion.

Furthermore, the high-frequency current passing through the connector may become a factor of producing a high-frequency noise which adversely affects other electronic components or other system components. Therefore, such high-frequency current must be removed or suppressed. In existing connectors, however, consideration is not sufficiently made of the countermeasure against the high-frequency current. Therefore, it is difficult to prevent the production of the high-frequency noise.

SUMMARY OF THE INVENTION

It is therefore an object of this invention to provide a connector which is capable of considerably suppressing a high-frequency current as an undesired harmonic to prevent production of a high-frequency noise.

Other objects of the present invention will become clear as the description proceeds.

According to a general aspect of the present invention, there is provided a connector comprising an insulator, at least one contact held by the insulator, and a high-frequency current suppressor for attenuating a high-frequency current flowing through the at least one contact and having a frequency within a frequency band between several tens MHz and several GHz.

According to another aspect of the present invention, there is provided a connector comprising an insulator, at least one contact held by the insulator, and a high-frequency current suppressor for attenuating a high-frequency current flowing through the at least one contact and having a frequency within a frequency band between several tens MHz and several GHz, the high-frequency current suppressor being deposited on the insulator so as to shield the at least one contact when the connector is connected to a mating connector.

According to still another aspect of the present invention, there is provided a connector comprising an insulator, at least one contact held by the insulator, and a high-frequency current suppressor for attenuating a high-frequency current flowing through the at least one contact and having a frequency within a frequency band between several tens MHz and several GHz, the high-frequency current suppressor being deposited on the at least one contact so as to shield the at least one contact.

According to yet another aspect of the present invention, there is provided a connector comprising an insulator, at least one contact held by the insulator, and a high-frequency current suppressor for attenuating a high-frequency current flowing through the at least one contact and having a frequency within a frequency band between several tens MHz and several GHz, the high-frequency current suppressor being interposed between the insulator and the at least one contact so as to shield the at least one contact.

According to a further aspect of the present invention, there is provided a connector comprising an insulator, at least one contact held by the insulator, and a high-frequency current suppressor for attenuating a high-frequency current flowing through the at least one contact and having a frequency within a frequency band between several tens MHz and several GHz, the high-frequency current suppressor being made of a magnetic substance of a magnetic composition comprising M, X and Y, where M is a metallic magnetic material consisting of Fe, Co, and/or Ni, X being element or elements other than M and Y, and Y being F, N, and/or O, the M—X—Y magnetic composition having a concentration of M in the composition so that the M—X—Y magnetic composition has a saturation magnetization of 35–80% of that of the metallic bulk of magnetic material comprising M alone, the magnetic composition having the maximum value $\mu''_{max}$ of an imaginary part $\mu''$ of relative permeability in a frequency range of 0.1–10 gigahertz (GHz).

DESCRIPTION OF PREFERRED EMBODIMENT

Now, description will be made of a connector of a high-frequency current suppressing type according to an embodiment of this invention.

Figure 1A:
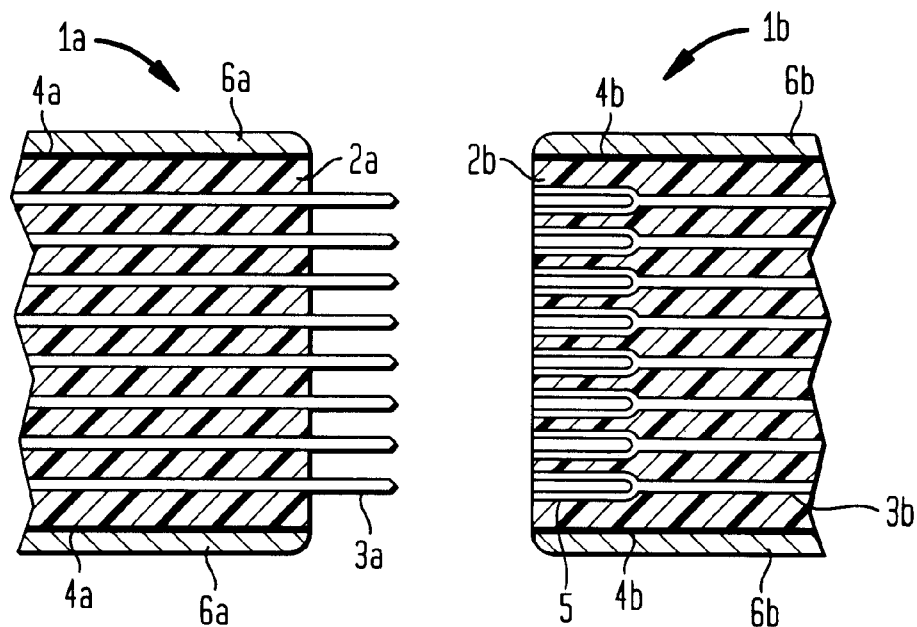
FIG. 1A is a sectional view of a connector of a high-frequency current suppressing type according to one embodiment of this invention in an unconnected state before a pin connector and a socket connector are connected.
Figure 1B:
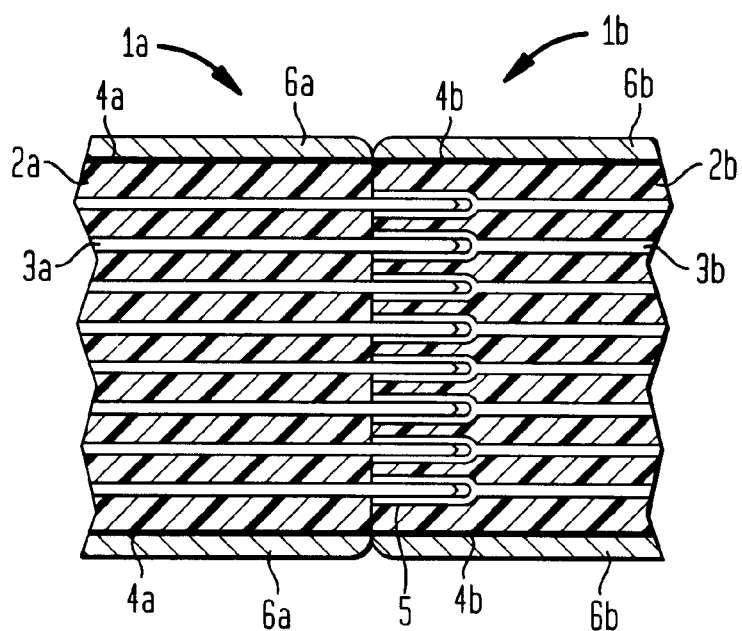
FIG. 1B is a sectional view of the connector illustrated in FIG. 1A in a connected state after the pin connector and the socket connector are connected.

Referring to FIGS. 1A and 1B, the connector of a high-frequency current suppressing type comprises a pin connector 1a and a socket connector 1b. The pin connector 1a comprises an insulator 2a, a plurality of (eight in the illustrated example) conductive pin contacts 3a fixedly held by the insulator 2a to perform signal transmission, and a cover or case 6a covering the outer periphery of the insulator 2a. Between the insulator 2a and the case 6a, a high-frequency current suppressor 4a is interposed. The high-frequency current suppressor 4a is preliminarily formed into a sheet-like shape and is fixed to the insulator 2a by the use of an adhesive or the like. The high-frequency current suppressor 4a serves to attenuate a high-frequency current flowing through the pin contacts 3a and having a frequency within a range between several tens MHz and several GHz.

The socket connector 1b comprises an insulator 2b, a plurality of (eight in the illustrated example) conductive socket contacts 3b fixedly held by the insulator 2b to perform signal transmission, and a cover or case 6b covering the outer periphery of the insulator 2b. The socket contacts 3b are to be contacted and fitted to the pin contacts 3a, respectively. Between the insulator 2b and the case 6b, a high-frequency current suppressor 4b is interposed. The high-frequency current suppressor 4b is preliminarily formed into a sheet-like shape and is fixed to the insulator 2b by the use of an adhesive or the like. The high-frequency current suppressor 4b serves to attenuate a high-frequency current flowing through the socket contacts 3b and having a frequency within a range between several tens MHz and several GHz.

Between a contacting portion or a socket portion of each socket contact 3b and the insulator 2b, a high-frequency current suppressor 5 is interposed to surround the socket portion. The high-frequency current suppressor 5 is formed on an outer surface of the socket portion of the socket contact 3b in the form of a film by the use of sputtering or vapor deposition well known in the art. The high-frequency current suppressor 5 serves to attenuate a high-frequency current flowing between the socket contact 3b and the pin contact 3a fitted thereto and having a frequency within a range between several tens MHz and several GHz.

The high-frequency current suppressor 5 may be preliminarily formed on a metallic plate material for use in producing the socket contacts 3b. Alternatively, the high-frequency current suppressor 5 may be formed on the surface of the individual socket contact 3b after it is produced from the metallic plate material. In the latter case, the socket contact 3b is covered with an appropriate mask except the outer surface of the socket portion and then subjected to the sputtering or the vapor deposition mentioned above to deposit the high-frequency current suppressor 5. Upon forming the high-frequency current suppressor 5, use may be made of chemical vapor deposition (CVD), ion beam deposition, gas deposition, and pattern transfer in addition to the sputtering or the vapor deposition mentioned above.

Each of the high-frequency current suppressors 4a, 4b, and 5 is a thin-film magnetic substance or member having a thickness between 0.3 and 20 μm and exhibits the conductivity within a frequency range smaller than several tens MHz.

As a material for each of the high-frequency current suppressors 4a, 4b, and 5, use may be made of a narrow-band magnetic loss material which has an M—X—Y composition as a mixture of components M (M being at least one of Fe, Co, and Ni), Y (Y being at least one of F, N, and O), and X (X being at least one element other than those contained in M and Y) and which has a permeability characteristic, given as a relationship between a frequency and an imaginary part $\mu''$ with respect to a real part $\mu'$ of relative permeability, such that the maximum value $\mu''_{max}$ of the imaginary part $\mu''$ (which may be called a magnetic loss term) is present within a frequency range between 100 MHz and 10 GHz and that a relative bandwidth bwr is not greater than 200% where the relative bandwidth bwr is obtained by extracting a frequency bandwidth between two frequencies at which the value of $\mu''$ is 50% of the maximum $\mu''_{max}$ and normalizing the frequency bandwidth at the center frequency thereof. It is assumed here that the narrow-band magnetic loss material has saturation magnetization between 80% and 60% of that of a metal magnetic material comprising the component M alone and a d.c. electric resistance between 100 $\mu\Omega$·cm and 700 $\mu\Omega$·cm.

As the material for each of the high-frequency current suppressors 4a, 4b, and 5, use may also be made of a wide-band magnetic loss material which has an M—X—Y composition as a mixture of components M (M being at least one of Fe, Co, and Ni), Y (Y being at least one of F, N, and O), and X (X being at least one element other than those contained in M and Y) and which has a permeability characteristic, given as a relationship between a frequency and an imaginary part $\mu''$ with respect to a real part $\mu'$ of relative permeability, such that the maximum value $\mu''_{max}$ of the imaginary part $\mu''$ is present within a frequency range between 100 MHz and 10 GHz and that a relative bandwidth bwr is not smaller than 150% where the relative bandwidth bwr is obtained by extracting a frequency bandwidth between two frequencies at which the value of $\mu''$ is 50% of the maximum $\mu''_{max}$ and normalizing the frequency bandwidth at the center frequency thereof. It is assumed here that the wide-band magnetic loss material has saturation magnetization between 60% and 35% of that of a metal magnetic material comprising the component M alone and a d.c. electric resistance greater than 500 $\mu\Omega\cdot$cm.

In each of the narrow-band magnetic loss material and the wide-band magnetic loss material used as the high-frequency current suppressors 4a, 4b, and 5, the component X is at least one of C, B, Si, Al, Mg, Ti, Zn, Hf, Sr, Nb, Ta, and rare earth elements. The component M is present in a granular structure where particles or grains of the component M are dispersed in a matrix of a compound of the components X and Y. The particles have an average particle size between 1 nm and 40nm. The narrow-band or the wide-band magnetic loss material has an anisotropic magnetic field of 47400 A/m or less. Preferably, the M—X—Y composition of the wide-band or the narrow-band magnetic loss material is an Fe—Al—O composition or an Fe—Si—O composition.

The pin connector 1a and the socket connector 1b of the above-mentioned structure are similar in appearance to those of the conventional connector. In an unconnected state illustrated in FIG. 1A, end portions of the pin contacts 3a of the pin connector 1a are exposed outside. In a connected state illustrated in FIG. 1B, the pin contacts 3a and the socket contacts 3b are entirely surrounded by the high-frequency current suppressors 4a and 4b. In addition, a contacting area between each pin contact 3a and each socket contact 3b is covered with the high-frequency current suppressor 5. Therefore, even in occurrence of the high-frequency current as an undesired harmonic having a frequency ranging from several tens MHz to several GHz, such high-frequency current can be sufficiently attenuated by the high-frequency current suppressors 4a, 4b, and 5. As a result, production of a high-frequency noise can be prevented so as to remove an adverse affect by the high frequency noise.

The structure of the pin connector 1a and the socket connector 1b illustrated in FIGS. 1A and 1B is no more than one example and may be modified in various manners which will presently be described.

For example, the high-frequency current suppressor 5 may be formed on an inner surface of the socket portion of the socket contact 3b or may be formed on both the inner and the outer surfaces of the socket portion. Furthermore, the high-frequency current suppressor 5 may be omitted.

Furthermore, another high-frequency current suppressor may be formed on the surface of each pin contact 3a in an area except the end portion to be exposed. The high-frequency current suppressor may be formed throughout an entire surface of the pin contact 3a. In the latter case, the high-frequency current suppresser serves as a conductor exhibiting the conductivity in a frequency band lower than several tens MHz. In either event, the effects of attenuating the high-frequency current and preventing the production of the high-frequency noise can be obtained. Therefore, the structure of the pin contact 3a and the socket contact 3b can be appropriately selected in dependence upon the level of the high-frequency current suppressing effect as required in a used environment. Practically, taking into consideration the wear of the high-frequency current suppressor due to contact friction produced between the contacts during inserting and removing operations of the connectors, it is preferable to select the structure illustrated in FIGS. 1A and 1B or a structure similar to the illustrated structure but without the high-frequency current suppressor 5.

In either event, as each of the high-frequency current suppressors 4a, 4b, and 5 used in the pin connector 1a and the socket connector 1b, use is made of a thin-film magnetic substance which is small in volume and therefore requires less space and which is a magnetic loss material having a large imaginary part (i.e., a "magnetic loss term") $\mu''$ of relative permeability so as to provide effective protection against undesired radiation. As a magnetic substance which can be increased in magnetic loss term, a granular magnetic material is known. Specifically, in case where the concentration of magnetic metal particles in the granular magnetic material falls within a particular range, excellent magnetic loss characteristic can be obtained in a high-frequency region.

Next, description will be made as to granular structure and production methods of M—X—Y magnetic composition.

Figure 2:
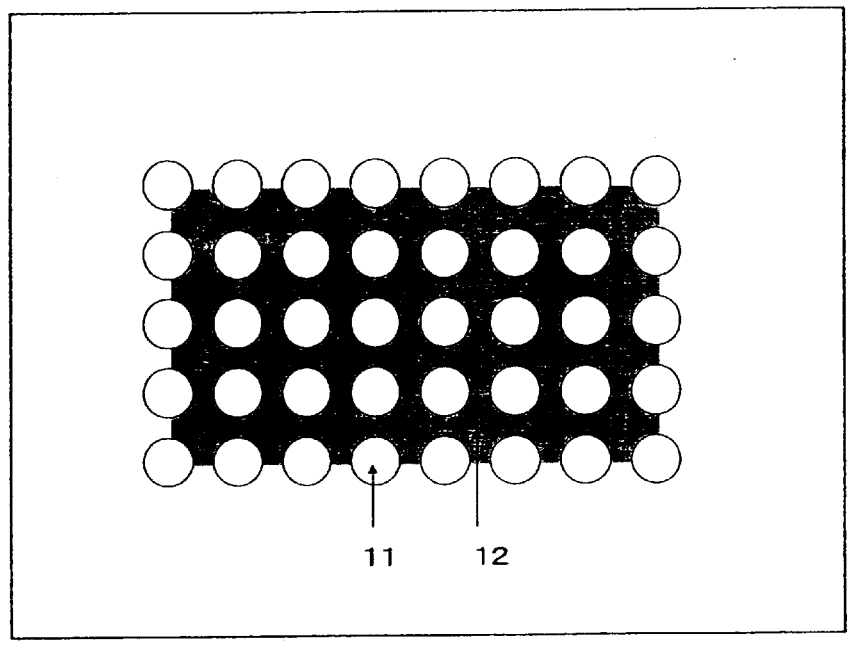
FIG. 2 is a schematic view showing a granular structure of M—X—Y magnetic composition.

Referring to FIG. 2 in which schematically shows the granular structure of M—X—Y magnetic composition, particles 11 of metallic magnetic material M are uniformly or evenly distributed in a matrix 12 consisting of X and Y.

Figure 3A:
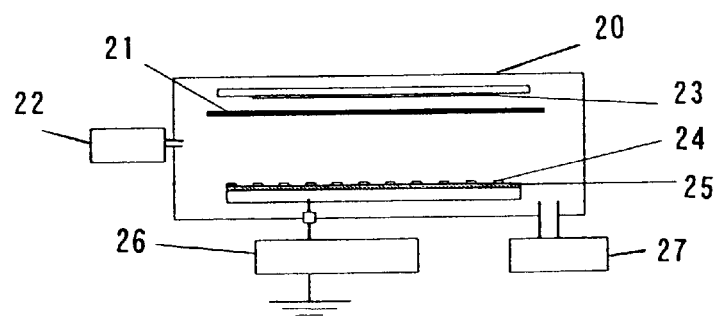
FIG. 3A is a schematic sectional view showing a structure of a sputtering apparatus which was used in examples.

Referring to FIG. 3A, a sputtering apparatus shown therein was used for producing samples in the following examples and comparative examples. The sputtering apparatus has a conventional structure and comprises a vacuum container 20, a shutter 21, an atmospheric gas source 22, a substrate or a glass plate 23, chips 24 (X or X—Y), a target 25 (M), an RF power source, and a vacuum pump 27. The atmospheric gas source 22 and the vacuum pump 27 are connected to the vacuum container 20. The substrate 23 confronts to the target 25 on which chips 24 are disposed. The shutter 21 is disposed in front of the substrate 23. The RF power source 26 is connected to the target 25.

Figure 3B:
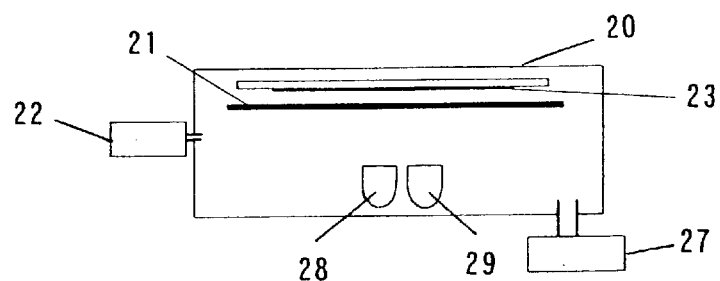
FIG. 3B is a schematic sectional view showing a structure of a vapor deposition apparatus which was used in examples.

Referring to FIG. 3B, a vapor deposition apparatus shown therein was also used as an apparatus for producing samples in the following examples and comparative examples. The vapor deposition apparatus has a conventional structure and has vacuum container 20, atmospheric gas source 22, and vacuum pump 27 similar to the sputtering apparatus shown in FIG. 3A but has a crucible 28 including materials (X—Y) and a crucible 29 including materials (M) in place of chips 24, target 25 and RF power source 26.

Referring to FIG. 3B, a vapor deposition apparatus shown therein was also used another apparatus for producing samples in the following examples and comparative examples. The vapor deposition apparatus has a conventional structure and has vacuum container 20, atmospheric gas source 22, and vacuum pump 27 similar to the sputtering apparatus but has a crucible 28 including materials (X—Y) in place of chips 24, target 25 and RF power source 26.

EXAMPLE 1

A thin film of M—X—Y magnetic composition was made on a glass plate by use of the sputtering apparatus shown in FIG. 3A at a sputtering condition shown in Table 1.

TABLE 1

| | |
|---|---|
| Vacuum degree before sputtering | <1 × 10⁻⁶ Torr |
| Atmosphere | Ar gas |
| Electric Power | RF |
| Targets | Fe (diameter of 100 mm) and Al$_2$O$_3$ chip (120 pieces) (chip size: 5 mm × 5 mm × 2 mm) |

The film sample 1 produced was analyzed by a fluorescent X-ray spectroscopy and confirmed as a film of a composition Fe$_{72}$Al$_{11}$O$_{17}$. The film sample 1 had 2.0 micrometer ($\mu$m) in thickness, 530 micro ohm centimeters ($\mu\Omega$·cm) in DC specific resistance, 18 Oe in anisotropy field (Hk), and 16,800 Gauss in saturation magnetization (Ms).

A percent ratio of the saturation magnetization of the film sample 1 and that of the metallic material M itself {Ms(M—X—Y)/Ms(M)}×100 was 72.2%.

Figure 4:
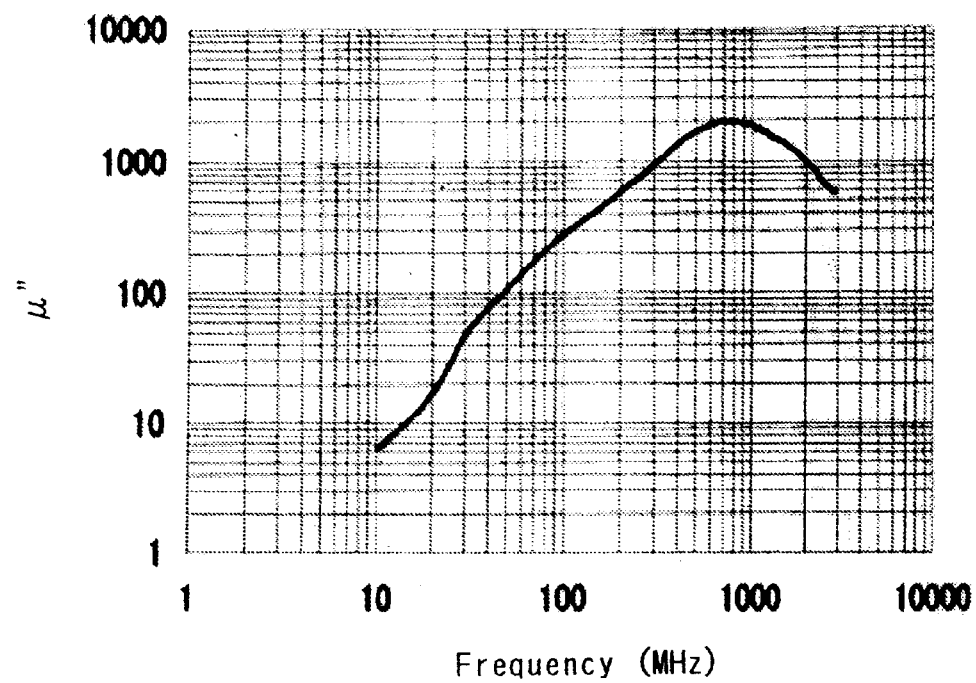
FIG. 4 is a graphical view showing a permeability frequency response of film sample 1 in Example 1.

In order to measure a permeability frequency response, the film sample 1 was formed in a ribbon like form and inserted in a coil. Under application of a bias magnetic field, an impedance variation of the coil was measured in response to frequency change of AC current applied to the coil. The measurement was several times for different values of the bias magnetic field. From the measured impedance variation in response to frequency variation, the permeability frequency response ($\mu''$-f response) was calculated and is shown in FIG. 4. It will be noted from FIG. 4 that the imaginary part of relative permeability has a high peak or the maximum value ($\mu''_{max}$) and rapidly falls either side of the peak. The natural resonance frequency (f($\mu''_{max}$)) showing the maximum value ($\mu''_{max}$) is about 700 MHz. From the $\mu''$-f response, a relative bandwidth bwr was determined as a percentage ratio of bandwidth between two frequency points which shows the imaginary part of relative permeability as a half value $\mu''_{50}$ of the maximum value $\mu''_{max}$, to center frequency of said bandwidth. The relative bandwidth bwr was 148%.

EXAMPLE 2

In a condition similar to that in Example 1 but using of 150 Al$_2$O$_3$ chips, a film sample 2 was formed on a glass plate.

The film sample 2 produced was analyzed by a fluorescent X-ray spectroscopy and confirmed as a film of a composition Fe$_{44}$Al$_{22}$O$_{34}$. The film sample 2 had 1.2 micrometer ($\mu$m) in thickness, 2400 micro ohm centimeters ($\mu\Omega$·cm) in DC specific resistance, 120 Oe in anisotropy field (Hk), and 9600 Gauss in saturation magnetization (Ms). It will be noted that film sample 2 is higher than film sample 1 in the specific resistance.

A percent ratio of the saturation magnetization of the film sample 2 and that of the metallic material M itself {Ms(M—X—Y)/Ms(M)}×100 was 44.5%.

Figure 5:
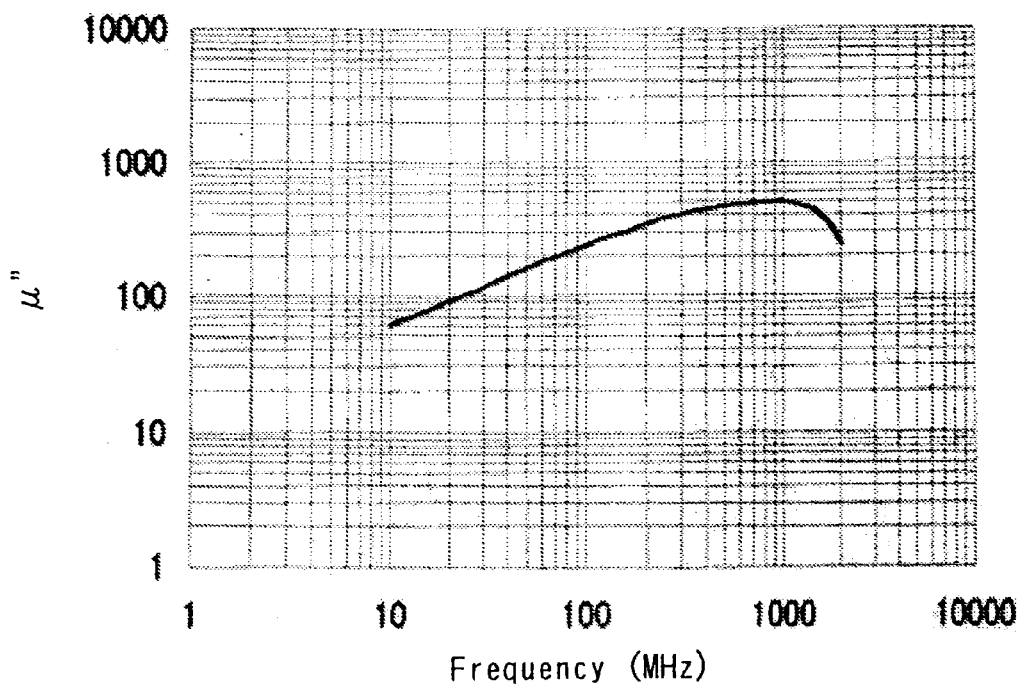
FIG. 5 is a graphical view showing a permeability frequency response of film sample 2 in Example 2.

The $\mu''$-f response of film sample 2 was also obtained in the similar manner as in Example 1 and shows in FIG. 5. It is noted that the peak has also a high value similar to that in film sample 1. However, the frequency point at the peak, or the natural resonance frequency is about 1 GHz and the imaginary part of relative permeability gradually falls either side of the peak so that the $\mu''$-f response has a broadband characteristic.

A relative bandwidth bwr of film sample 2 was also confirmed as 181% by the similar way as in Example 1.

COMPARATIVE EXAMPLE 1

In a condition similar to that in Example 1 but using of 90 Al$_2$O$_3$ chips, a comparative sample 1 was formed on a glass plate.

The comparative sample 1 produced was analyzed by a fluorescent X-ray spectroscopy and confirmed as a film of a composition Fe$_{86}$Al$_6$O$_8$. The comparative sample 1 had 1.2 micrometer ($\mu$m) in thickness, 74 micro ohm centimeters ($\mu\Omega$·cm) in DC specific resistance, 22 Oe in anisotropy field (Hk), 18,800 Gauss in saturation magnetization (Ms), and 85.7% in a percent ratio of the saturation magnetization of the comparative sample 1 and that of the metallic material M itself {Ms(M—X—Y)/Ms(M)}×100, and was 44.5%.

Figure 6:
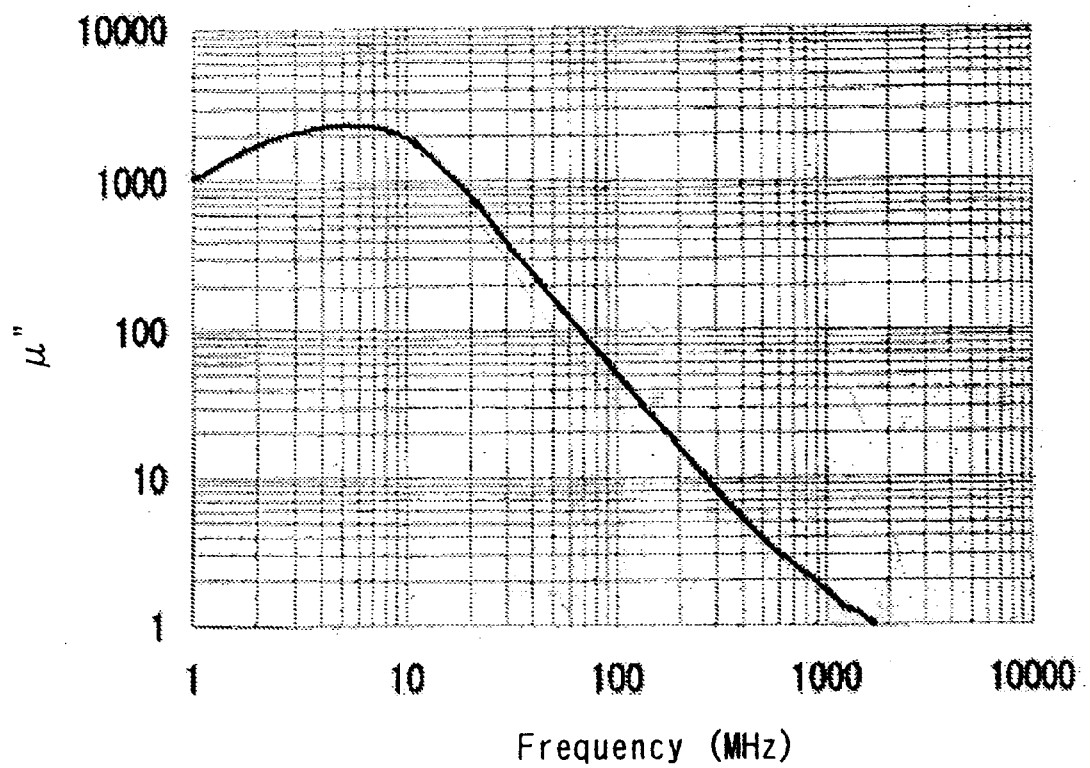
FIG. 6 is a graphical view showing a permeability frequency response of comparable sample 1 in Comparable Example 1.

The $\mu''$-f response of comparative sample 1 was also obtained in the similar manner as in Example 1, and is shown in FIG. 6. It will be noted from FIG. 6 that the imaginary part of relative permeability $\mu''$ of the comparative sample 1 has a high peak at a frequency about 10 MHz but rapidly reduces at the higher frequency range than 10 MHz. It can be supposed that this reduction is caused by generation of eddy current due to the lower specific resistance.

COMPARATIVE EXAMPLE 2

In a condition similar to that in Example 1 but using of 200 Al$_2$O$_3$ chips, a comparative sample 2 was formed on a glass plate.

The comparative sample 2 produced was analyzed by a fluorescent X-ray spectroscopy and confirmed as a film of a composition Fe$_{19}$Al$_{34}$O$_{47}$. The comparative sample 2 had 1.3 micrometer ($\mu$m) in thickness, 10,500 micro ohm centimeters ($\mu\Omega$·cm) in DC specific resistance.

The magnetic characteristic of comparative sample 1 exhibited superparamagnetism.

EXAMPLE 4

A thin film of M—X—Y magnetic composition was made on a glass plate by the reactive sputtering method using the sputtering apparatus shown in FIG. 3A at a sputtering condition shown in Table 2. The partial pressure ratio of N$_2$ was 20%. The thin film was heat-treated at a temperature of 300° C. for two hours in vacuum under magnetic field and obtained a film sample 4.

TABLE 2

| | |
|---|---|
| Vacuum degree before sputtering | <1 × 10⁻⁶ Torr |
| Atmosphere | Ar+N$_2$ gas |
| Electric Power | RF |
| Targets | Fe (diameter of 100 mm) and Al chip (150 pieces) (chip size: 5 mm × 5 mm × 2 mm) |

The properties of flim sample 4 are show in Table 3.

TABLE 3

| | |
|---|---|
| Film thickness | 1.5 $\mu$m |
| {Ms(M-X-Y)/Ms(M)} × 100 | 51.9% |
| $\mu''_{max}$ | 520 |
| f($\mu''_{max}$) | 830 MHz |
| bwr | 175% |

EXAMPLE 5

A thin film of M—X—Y magnetic composition was made on a glass plate by using the sputtering apparatus shown in FIG. 3A at a sputtering condition shown in Table 4. The thin film was heat-treated at a temperature of 300° C. for two hours in vacuum under magnetic field and obtained a film sample 5.

TABLE 4

| | |
|---|---|
| Vacuum degree before sputtering | <1 × 10⁻⁶ Torr |
| Atmosphere | Ar gas |
| Electric Power | RF |
| Targets | Co (diameter of 100 mm) and Al$_2$O$_3$ chip (130 pieces) (chip size: 5 mm × 5 mm × 2 mm) |

The properties of film sample 5 are show in Table 5.

TABLE 5

| | |
|---|---|
| Film thickness | 1.1 μm |
| {Ms(M-X-Y)/Ms(M)} × 100 | 64.7% |
| $\mu''_{max}$ | 850 |
| f($\mu''_{max}$) | 800 MHz |
| bwr | 157% |

EXAMPLE 6

A thin film of M—X—Y magnetic composition was made on a glass plate by the reactive sputtering method using the sputtering apparatus shown in FIG. 3A at a sputtering condition shown in Table 6. The partial pressure ratio of N$_2$ was 10%. The thin film was heat-treated at a temperature of 300° C. for two hours in vacuum under magnetic field and obtained a film sample 6.

TABLE 6

| | |
|---|---|
| Vacuum degree before sputtering | <1 × 10⁻⁶ Torr |
| Atmosphere | Ar + N$_2$ gas |
| Electric Power | RF |
| Targets | Co (diameter of 100 mm) and Al chip (170 pieces) (chip size: 5 mm × 5 mm × 2 mm) |

The properties of film sample 6 are show in Table 7.

TABLE 7

| | |
|---|---|
| Film thickness | 1.2 μm |
| {Ms(M-X-Y)/Ms(M)} × 100 | 32.7% |
| $\mu''_{max}$ | 350 |
| f($\mu''_{max}$) | 1 GHz |
| bwr | 191% |

EXAMPLE 7

A thin film of M—X—Y magnetic composition was made on a glass plate by using the sputtering apparatus shown in FIG. 3A at a sputtering condition shown in Table 8. The thin film was heat-treated at a temperature of 300° C. for two hours in vacuum under magnetic field and obtained a film sample 7.

TABLE 8

| | |
|---|---|
| Vacuum degree before sputtering | <1 × 10⁻⁶ Torr |
| Atmosphere | Ar gas |
| Electric Power | RF |
| Targets | Ni (diameter of 100 mm) and Al$_2$O$_3$ chip (140 pieces) (chip size: 5 mm × 5 mm × 2 mm) |

The properties of film sample 4 are show in Table 9.

TABLE 9

| | |
|---|---|
| Film thickness | 1.7 μm |
| {Ms(M-X-Y)/Ms(M)} × 100 | 58.2% |
| $\mu''_{max}$ | 280 |
| f($\mu''_{max}$) | 240 MHz |
| bwr | 169% |

EXAMPLE 8

A thin film of M—X—Y magnetic composition was made on a glass plate by the reactive sputtering method using the sputtering apparatus shown in FIG. 3A at a sputtering condition shown in Table 10. The partial pressure ratio of N$_2$ was 10%. The thin film was heat-treated at a temperature of 300° C. for two hours in vacuum under magnetic field and obtained a film sample 8.

TABLE 10

| | |
|---|---|
| Vacuum degree before sputtering | <1 × 10⁻⁶ Torr |
| Atmosphere | Ar + N$_2$ gas |
| Electric Power | RF |
| Targets | Ni (diameter of 100 mm) and Al chip (100 pieces) (chip size: 5 mm × 5 mm × 2 mm) |

The properties of film sample 10 are show in Table 11.

TABLE 11

| | |
|---|---|
| Film thickness | 1.3 μm |
| {Ms(M-X-Y)/Ms(M)} × 100 | 76.2% |
| $\mu''_{max}$ | 410 |
| f($\mu''_{max}$) | 170 MHz |
| bwr | 158% |

EXAMPLE 9

A thin film of M—X—Y magnetic composition was made on a glass plate by using the sputtering apparatus shown in FIG. 3A at a sputtering condition shown in Table 12. The thin film was heat-treated at a temperature of 300° C. for two hours in vacuum under magnetic field and obtained a film sample 9.

TABLE 12

| | |
|---|---|
| Vacuum degree before sputtering | <1 × 10⁻⁶ Torr |
| Atmosphere | Ar gas |
| Electric Power | RF |
| Targets | Fe (diameter of 100 mm) and TiO$_2$ chip (150 pieces) (chip size: 5 mm × 5 mm × 2 mm) |

The properties of film sample 9 are show in Table 13.

TABLE 13

| | |
|---|---|
| Film thickness | 1.4 μm |
| {Ms(M-X-Y)/Ms(M)} × 100 | 43.6% |
| $\mu''_{max}$ | 920 |
| f($\mu''_{max}$) | 1.5 GHz |
| bwr | 188% |

EXAMPLE 10

A thin film of M—X—Y magnetic composition was made on a glass plate by the reactive sputtering method using the sputtering apparatus shown in FIG. 3A at a sputtering condition shown in Table 14. The partial pressure ratio of $O_2$ was 15%. The thin film was heat-treated at a temperature of 300° C. for two hours in vacuum under magnetic field and obtained a film sample 10.

TABLE 14

| | |
|---|---|
| Vacuum degree before sputtering | <1 × 10⁻⁶ Torr |
| Atmosphere | Ar + $O_2$ gas |
| Electric Power | RF |
| Targets | Fe (diameter of 100 mm) and Si chip (130 pieces) (chip size: 5 mm × 5 mm × 2 mm) |

The properties of film sample 10 are show in Table 15.

TABLE 15

| | |
|---|---|
| Film thickness | 1.5 μm |
| {Ms(M-X-Y)/Ms(M)} × 100 | 55.2% |
| $\mu''$ max | 920 |
| f($\mu''$ max) | 1.2GHz |
| bwr | 182% |

EXAMPLE 11

A thin film of M—X—Y magnetic composition was made on a glass plate by using the sputtering apparatus shown in FIG. 3A at a sputtering condition shown in Table 16. The thin film was heat-treated at a temperature of 300° C. for two hours in vacuum under magnetic field and obtained a film sample 11.

TABLE 16

| | |
|---|---|
| Vacuum degree before sputtering | <1 × 10⁻⁶ Torr |
| Atmosphere | Ar gas |
| Electric Power | RF |
| Targets | Fe (diameter of 100 mm) and $HfO_3$ chip (100 pieces) (chip size: 5 mm × 5 mm × 2 mm) |

The properties of film sample 11 are show in Table 17.

TABLE 17

| | |
|---|---|
| Film thickness | 1.8 μm |
| {Ms(M-X-Y)/Ms(M)} × 100 | 77.4% |
| $\mu''$ max | 1800 |
| f($\mu''$ max) | 450MHz |
| bwr | 171% |

EXAMPLE 12

A thin film of M—X—Y magnetic composition was made on a glass plate by using the sputtering apparatus shown in FIG. 3A at a sputtering condition shown in Table 18. The thin film was heat-treated at a temperature of 300° C. for two hours in vacuum under magnetic field and obtained a film sample 12.

TABLE 18

| | |
|---|---|
| Vacuum degree before sputtering | <1 × 10⁻⁶ Torr |
| Atmosphere | Ar gas |
| Electric Power | RF |
| Targets | Fe (diameter of 100 mm) and BN chip (130 pieces) (chip size: 5 mm × 5 mm × 2 mm) |

The properties of film sample 12 are show in Table 19.

TABLE 19

| | |
|---|---|
| Film thickness | 1.9 μm |
| {Ms(M-X-Y)/Ms(M)} × 100 | 59.3% |
| $\mu''$ max | 950 |
| f($\mu''$ max) | 680MHz |
| bwr | 185% |

EXAMPLE 13

A thin film of M—X—Y magnetic composition was made on a glass plate by using the sputtering apparatus shown in FIG. 3A at a sputtering condition shown in Table 20. The thin film was heat-treated at a temperature of 300° C. for two hours in vacuum under magnetic field and obtained a film sample 13.

TABLE 20

| | |
|---|---|
| Vacuum degree before sputtering | <1 × 10⁻⁶ Torr |
| Atmosphere | Ar gas |
| Electric Power | RF |
| Targets | $Fe_{50}Co_{50}$ (diameter of 100 mm) and $Al_2O_3$ chip (130 pieces) (chip size: 5 mm × 5 mm × 2 mm) |

The properties of film sample 13 are show in Table 21.

TABLE 21

| | |
|---|---|
| Film thickness | 1.6 μm |
| {Ms(M-X-Y)/Ms(M)} × 100 | 59.3% |
| $\mu''$ max | 720 |
| f($\mu''$ max) | 1.1GHz |
| bwr | 180% |

EXAMPLE 14

A thin film of M—X—Y magnetic composition was made on a glass plate by using the vapor deposition apparatus shown in FIG. 3B at a condition shown in Table 22. The thin film was heat-treated at a temperature of 300° C. for two hours in vacuum under magnetic field and obtained a film sample 14.

TABLE 22

| | |
|---|---|
| Vacuum degree before sputtering | <1 × 10⁻⁶ Torr |
| Atmosphere flowing rate | $O_2$ at 3.0 sccm |
| Elements in crucible 28 and 29 | Fe and Al |

The properties of film sample 14 are show in Table 23.

TABLE 23

| | |
|---|---|
| Film thickness | 1.1 μm |
| {Ms(M-X-Y)/Ms(M)} × 100 | 41.8% |

TABLE 23-continued

| | |
|---|---|
| $\mu''$ max | 590 |
| f($\mu''$ max) | 520MHz |
| bwr | 190% |

Now, description will be made as to tests relating to noise suppressing effect of sample films and comparative samples, using a test apparatus shown in FIG. 7.

A test piece was film sample 1 with dimensions of 20 mm×20 mm×2.0 µm. For a comparison, a sheet of known composite magnetic material having dimensions of 20 mm×20 mm×1.0 mm. The composite magnetic material comprising polymer and flat magnetic metal powder dispersed in the polymer. The magnetic metal powder comprises Fe, Al and Si. The composite magnetic material has a permeability distribution in quasi-microwave range and has the maximum value of the imaginary part of relative permeability at a frequency about 700 MHz. Table 24 shows magnetic properties of both of the test piece and comparative test piece.

TABLE 24

| | Film sample 1 | Comparative test piece |
|---|---|---|
| $\mu''$/700MHz | about 1800 | about 3.0 |
| bwr | 148 | 196 |

As seen from Table 24, the film sample 1 is about 600 times more than comparative test piece in the maximum value of imaginary part of relative permeability. Since the noise suppressing effect is generally evaluated from a value of a product ($\mu''_{max} \times \delta$) of the maximum value $\mu''_{max}$ of the imaginary part of relative permeability and thickness of the piece $\delta$, the thickness of the comparative test piece of the composite magnetic material sheet was selected 1 mm so that the both of test pieces have the similar values of ($\mu''_{max} \times \delta$).

Figure 7:
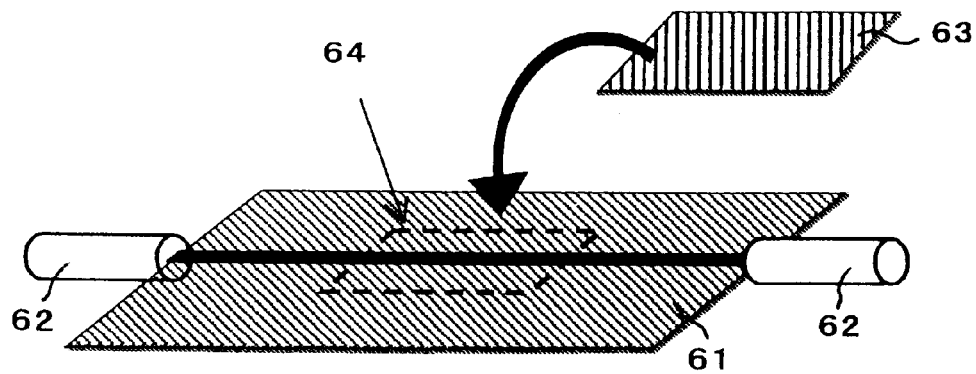
FIG. 7 is a schematic and perspective view of a test apparatus for testing an noise suppressing effect of magnetic samples.

Referring to FIG. 7, the test apparatus comprises a microstrip line 61 having two ports, coaxial cables 62 connected to the two ports, and a network analyzer (not shown) connected across the two ports. The micro-strip line 61 has a line length of 75 mm and a characteristic impedance of 50 ohms. The test piece 63 was disposed at a region 64 on the micro-strip line 61 and the transmission characteristic S21 was measured. The frequency response of S21 are shown in FIGS. 8A and 8B for film sample 1 and the comparative sample, respectively.

Figure 8A:
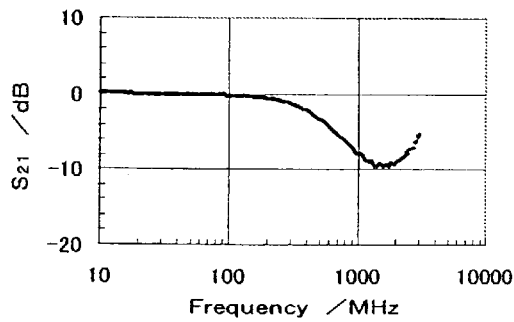
FIG. 8A is a graphic view showing a transmission characteristic of film sample 1.
Figure 8B:
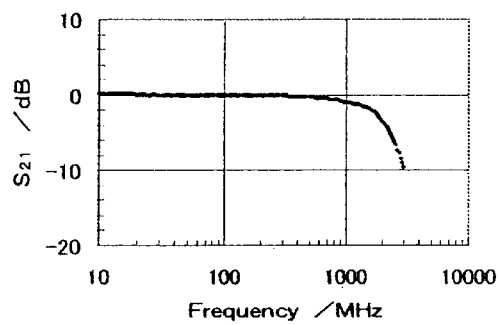
FIG. 8B is a graphic view showing a transmission characteristic of comparable sample of composite magnetic material sheet.

With respect to use of film sample 1, it will be noted from FIG. 8A that S21 reduces above 100 MHz, becomes to the minimum of −10 dB at a frequency of 2 GHz and then increases above 2 GHz. On the other hand, with respect to use of comparative sample, it will be noted from FIG. 8B that S21 gradually reduces and becomes to the minimum of −10 dB at a frequency of 3 GHz.

The results demonstrate that S21 is dependent on the frequency distribution of the permeability and that the noise suppressing effect is dependent on the product of ($\mu''_{max} \times \delta$).

Figures 9A, 9B, 9C:
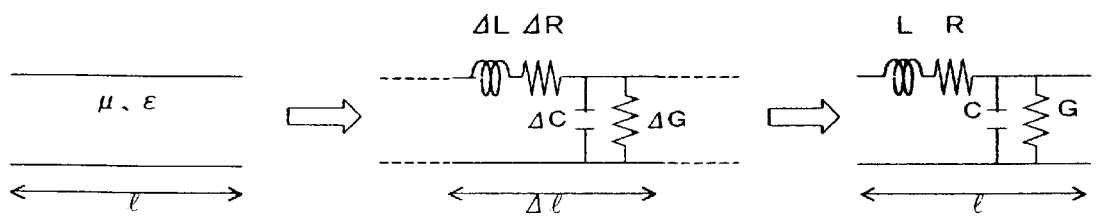
FIG. 9A is a distribution constant circuit with a length 1 showing a magnetic material as a noise suppressor.
FIG. 9B is an equivalent circuit with a unit length Δl of the distribution constant circuit of FIG. 9A.
FIG. 9C is an equivalent circuit with a length 1 of the distribution constant circuit of FIG. 9A.

Now, providing that the magnetic sample forms a distribution constant circuit having a length of l as shown in FIG. 9A, an equivalent circuit was calculated for a unit length of $\Delta$l from transmission characteristics S11 and S21, as shown in FIG. 9B. Then, the equivalent circuit for the length l was obtained from the equivalent circuit for the unit length $\Delta$l, as shown in FIG. 9C. The equivalent circuit of the magnetic sample comprises series inductance L and resistance R and parallel capacitance C and conductance G, as shown in FIG. 9C. From this, it will be understood that the change of transmission characteristic of the micro-strip line caused due to disposition of the magnetic substance on the micro-strip line is mainly determined by the equivalent resistance R added in series.

Figure 10A:
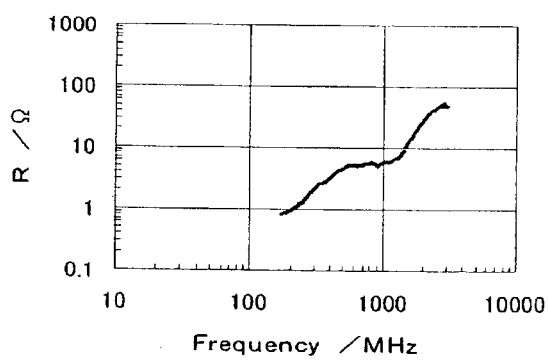
FIG. 10A is a graphic view showing a frequency response of an equivalent resistance R of film sample 1 in Example 1.
Figure 10B:
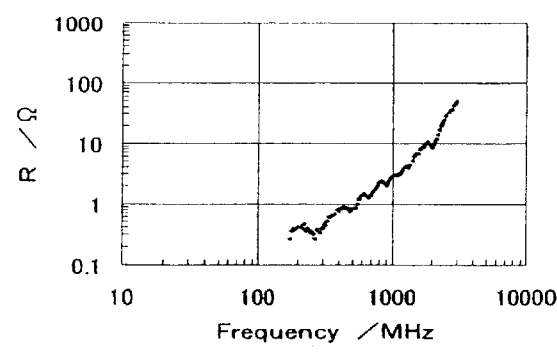
FIG. 10B is a graphic view showing a frequency response of an equivalent resistance R of comparative sample of a composite magnetic material sheet.

In view of the above, a frequency response of the equivalent resistance R was measured. The measured data were shown in FIGS. 10A and 10B for the film sample 1 and the comparative sample, respectively. It will be noted from these figures that the equivalent resistance R gradually reduces in the quasi-microwave range and is about 60 ohms at about 3 GHz. It is seen that the frequency dependency of the equivalent resistance R is different from that of the imaginary part of relative permeability which has the maximum value at about 1 GHz. It will be supposed that this difference will be based on the gradual increase of a ratio of the product and the sample length to the wavelength.

What is claimed is:

1. A connector comprising:
   an insulator;
   at least one contact held by said insulator; and
   a high-frequency current suppressor for attenuating a high-frequency current flowing through said at least one contact and having a frequency within a frequency band between several tens MHz and several GHz, said high-frequency current suppressor being made of a magnetic substance of a magnetic composition comprising M, X and Y, where M is a metallic magnetic material consisting of Fe, Co, and/or Ni, X being element or elements other than M and Y, and Y being F, N, and/or O, said M—X—Y magnetic composition having a concentration of M in the composition so that said M—X—Y magnetic composition has a saturation magnetization of 35–80% of that of the metallic bulk of magnetic material comprising M alone, said magnetic composition having the maximum value $\mu''_{max}$ of imaginary part $\mu''$ of relative permeability in a frequency range of 0.1–10 gigahertz (GHz).

2. A connector as claimed in claim 1, wherein said magnetic substance has saturation magnetization between 80% and 60% of that of a metal magnetic material comprising the component M alone.

3. A connector as claimed in claim 1, wherein said magnetic substance has a d.c. electric resistance between 100 µΩ·cm and 700 µΩ·cm.

4. A connector as claimed in claim 1, which has a permeability frequency response of a relatively broad band where a relative bandwidth bwr is 150% or more, said relative bandwidth bwr is determined as a percentage ratio of bandwidth between two frequency points which shows the imaginary part of relative permeability as a half value $\mu''_{50}$ of the maximum value $\mu''_{max}$, to center frequency of said bandwidth.

5. A connector as claimed in claim 4, wherein said magnetic substance has saturation magnetization between 60% and 35% of that of a metal magnetic material comprising the component M alone.

6. A connector as claimed in claim 4, wherein said magnetic substance has a d.c. electric resistance greater than 500 µΩ·cm.

7. A connector as claimed in claim 1, wherein the component X of said magnetic substance is at least one selected from C, B, Si, Al, Mg, Ti, Zn, Hf, Sr, Nb, Ta, and rare earth elements.

8. A connector as claimed in claim 1, wherein the component M of said magnetic substance is present in a granular structure where particles or grains of the component M are dispersed in a matrix of a compound of the components X and Y.

9. A connector as claimed in claim 8, wherein said magnetic substance is formed so that said particles in the granular structure have an average particle size between 1 nm and 40 nm.

10. A connector as claimed in claim 1, wherein said magnetic substance has an anisotropic magnetic field of 47400 A/m or less.

11. A connector as claimed in claim 1, wherein the M—X—Y composition is an Fe—Al—O composition.

12. A connector as claimed in claim 1, wherein the M—X—Y composition is an Fe—Si—O composition.

13. A connector as claimed in claim 1, wherein said suppressor surrounds an area of contract between said contact and another contact, and through which area of contact a high-frequency current flows.

14. A connector as claimed in clam 1, wherein said high-frequency current suppressor is deposited on said insulator so as to shield said at least one contact when said connector is connected to a mating connector.

15. A connector as claimed in claim 1, wherein said high-frequency current suppressor is deposited on said at least one contact so as to shield said at least one contact.

16. A connector as claimed in claim 1, wherein said high-frequency current suppressor is interposed between said insulator and said at least one contact so as to shield said at least one contact.

17. A connector as claimed in claim 1, wherein said high-frequency current suppressor is produced by sputtering.

18. A connector as claimed in claim 1, wherein said high-frequency current suppressor is produced by vapor deposition.

19. A connector as claimed in claim 1, wherein said high-frequency current suppressor is preliminarily deposited on a metallic plate material for use in producing said at least one contact.

20. A connector as claimed in claim 1, wherein said high-frequency current suppressor is deposited on the surface of said at lest one contact after it is produced by cutting a metallic plate material fur use in producing said at least one contact.

21. A connector as claimed in claim 1, wherein said connector is a socket connector in which said at least one contact is of a socket type.

22. A connector as claimed in claim 1, wherein said connector is a pin connector in which said at lest one contact is of a pin type.

23. A connector as claimed in claim 1, wherein said high-frequency current suppressor has a thickness between 0.3 $\mu$m and 20 $\mu$m.

24. A connector as claimed in claim 1, wherein said high-frequency current suppressor is a thin-film magnetic substance.

25. A connector as claimed in claim 1, wherein said high-frequency current suppressor exhibits the conductivity in a frequency range lower than several tens MHz.

* * * * *